(12) United States Patent
Crossgrove

(10) Patent No.: US 7,933,902 B2
(45) Date of Patent: Apr. 26, 2011

(54) DATA REPAIR METHOD AND SYSTEM

(75) Inventor: James Robert Crossgrove, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/025,901

(22) Filed: Feb. 5, 2008

(65) Prior Publication Data
US 2009/0198743 A1 Aug. 6, 2009

(51) Int. Cl.
*G06F 7/00* (2006.01)
(52) U.S. Cl. .................. 707/736; 707/755; 707/766
(58) Field of Classification Search .................. 707/201, 707/736
See application file for complete search history.

(56) References Cited

U.S. PATENT DOCUMENTS
2003/0074600 A1* 4/2003 Tamatsu ............... 714/6
* cited by examiner

*Primary Examiner* — Etienne P LeRoux
*Assistant Examiner* — Ajith Jacob
(74) *Attorney, Agent, or Firm* — Schmeiser, Olsen & Watts; John R. Pivnichny

(57) ABSTRACT

A data repair method and system. The method includes enabling by a computing system for a user, access to the computing system. The computing system comprises a database. The computing system retrieves from the database, first data associated with the user. The computing system generates a first data object from the first data. The computing system analyzes the first data object. The computing system determines that the first data object comprises an invalid data value. The computing system determines a first data value comprising a valid data value. The computing system retrieves the first data value from the database. The computing system replaces the invalid data value with said first data value. The computing system generates from the first data object, a first updated data object comprising the first data value. The computing system stores the first updated data object.

24 Claims, 3 Drawing Sheets

DATA REPAIR METHOD AND SYSTEM

FIELD OF THE INVENTION

The present invention relates to a method and associated system for repairing data objects.

BACKGROUND OF THE INVENTION

Modifying computer stored material typically comprises a complicated and inefficient process with little flexibility. A user wishing to retrieve accurate material may not have the ability or authorization to generate modifications to the material. Inaccurate material may cause computer functions to malfunction. Accordingly, there exists a need in the art to overcome at least some of the deficiencies and limitations described herein above.

SUMMARY OF THE INVENTION

The present invention provides a data repair method comprising:

enabling, by a computing system for a user, access to said computing system, wherein said computing system comprises a memory system, and wherein said memory system comprises a database;

retrieving, by said computing system from said database, first data associated with said user;

generating, by said computing system from said first data, a first data object;

analyzing, by said computing system, said first data object;

determining, by said computing system in response to said analyzing, that said first data object comprises an invalid data value;

determining, by said computing system, a first data value, said first data value comprising a valid data value;

retrieving, by said computing system from said database, said first data value;

replacing, by said computing system, said invalid data value with said first data value;

generating, by said computing system from said first data object, a first updated data object comprising said first data value; and storing, by said computing system in said memory system, said first updated data object.

The present invention provides a computing system comprising a processor coupled to a computer-readable memory unit, said memory unit comprising instructions that when executed by the processor implement a data repair method, said method comprising:

enabling, by said computing system for a user, access to said computing system, wherein said computer-readable memory unit comprises a database;

retrieving, by said computing system from said database, first data associated with said user;

generating, by said computing system from said first data, a first data object;

analyzing, by said computing system, said first data object;

determining, by said computing system in response to said analyzing, that said first data object comprises an invalid data value;

determining, by said computing system, a first data value, said first data value comprising a valid data value;

retrieving, by said computing system from said database, said first data value;

replacing, by said computing system, said invalid data value with said first data value;

generating, by said computing system from said first data object, a first updated data object comprising said first data value; and storing, by said computing system in said memory system, said first updated data object.

The present invention provides a computer program product, comprising a computer readable medium comprising a computer readable program code embodied therein, said computer readable program code adapted to implement data repair method within a computing system comprising a computer-readable memory unit, said method comprising:

enabling, by said computing system for a user, access to said computing system, wherein said computer-readable memory unit comprises a database;

retrieving, by said computing system from said database, first data associated with said user;

generating, by said computing system from said first data, a first data object;

analyzing, by said computing system, said first data object;

determining, by said computing system in response to said analyzing, that said first data object comprises an invalid data value;

determining, by said computing system, a first data value, said first data value comprising a valid data value;

retrieving, by said computing system from said database, said first data value;

replacing, by said computing system, said invalid data value with said first data value;

generating, by said computing system from said first data object, a first updated data object comprising said first data value; and storing, by said computing system in said memory system, said first updated data object.

The present invention provides a process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a data repair method, said method comprising:

enabling, by said computing system for a user, access to said computing system, wherein said computer-readable memory unit comprises a database;

retrieving, by said computing system from said database, first data associated with said user;

generating, by said computing system from said first data, a first data object;

analyzing, by said computing system, said first data object;

determining, by said computing system in response to said analyzing, that said first data object comprises an invalid data value;

determining, by said computing system, a first data value, said first data value comprising a valid data value;

retrieving, by said computing system from said database, said first data value;

replacing, by said computing system, said invalid data value with said first data value;

generating, by said computing system from said first data object, a first updated data object comprising said first data value; and storing, by said computing system in said memory system, said first updated data object.

The present invention advantageously provides a simple method and associated system capable modifying computer stored material.

DETAILED DESCRIPTION OF THE INVENTION

Figure 1:
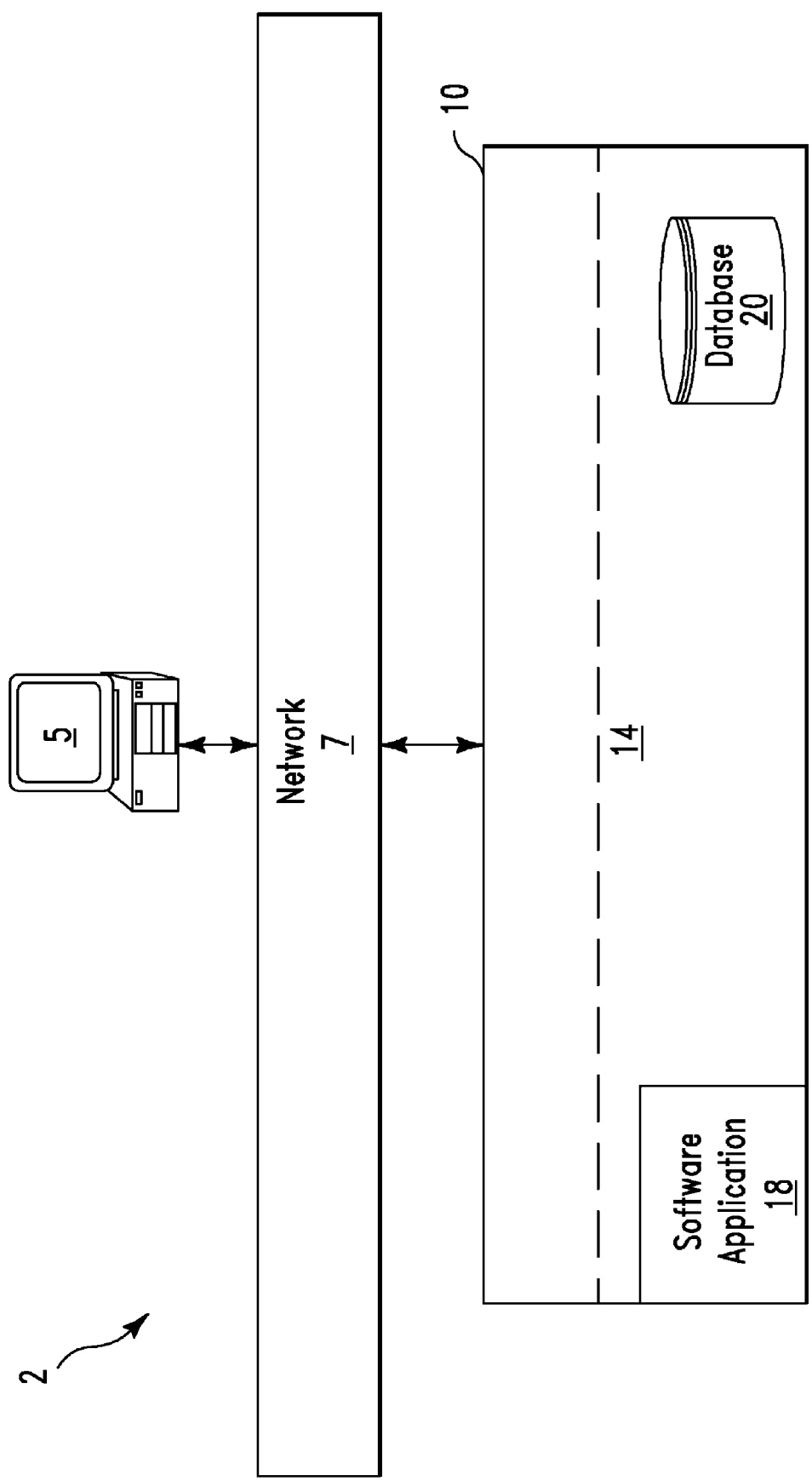
FIG. 1 illustrates a system for repairing data objects during operation of a software application, in accordance with embodiments of the present invention.

FIG. 1 illustrates a system 2 for repairing data objects during operation of a software application 18, in accordance with embodiments of the present invention. System 2 comprises an input/output (I/O) devices 5 connected to a computing system 10 through a network 7. I/O device 5 may comprise any type of I/O device such as, inter alia, a notebook computer, a desktop computer, a personal digital assistant (PDA), etc. I/O device 5 may be used by a user (i.e., a requester) accessing software application 18. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14. Memory system 14 comprises software application 18 and a database 20. Database 20 may comprise any user related data used by software application 18 for performing functions. The user related data may comprise, inter alia, user profiles, database tables, etc. Software application 18 may comprise any type of software application, including, a word processor application, a spreadsheet application, a purchase requisition application, etc. Software application 18 controls all functions related to:

1. Performing intended functions.
2. Repairing invalid data used for performing intended functions.

Software application 18 comprises logic that enables software application 18 to repair required data as software application 18 performs intended functions. Software application 18 comprises the ability to detect an invalid data value (e.g., a blank data value, an incorrect data value, an obsolete data value, etc) within data or a data object (i.e., located in database 20) while the data is being accessed by software application 18. Upon detecting an invalid data value, software application 18 determines a valid data value and retrieves the valid data value from database 20. Software application 18 replaces the invalid data value with the valid data value and all records are updated.

Software application 18 comprises a database component that provides a capability to:

1. Lookup up a data object (e.g., an entity) using key columns (e.g., find by key).
2. Update field values on the data object.
3. Make permanent updates in the database for all changed data objects when a transaction is complete.

A find by key within software application 18 is modified in order to perform additional work (i.e., associated with invalid data). After the find by key retrieves data values from database 20, software application 18 performs the following steps:

1. Check a field in question to determine if the field comprises an invalid data value (e.g., a blank data value, an incorrect data value, an obsolete data value, etc).
2. If an invalid data value is located, software application 18 determines a valid data value. The valid data value may comprise a default data value determined by looking at other data in database 20.
3. Software application 18 sets the field to the new value.
4. Software application 18 stores the new value in database 20.

System 2 comprises the following functionality for repairing data objects (e.g., performing updates to a user profile record) during operation of a software application 18 using the following steps:

1. A user logs into computer system 10.
2. Computing system 10 retrieves data from database 20. The data may comprise data associated with inter alia: a user account, a shopping cart, a bank account, etc.
3. Computing system 10 evaluates a data element that was retrieved.
4. Computing system 10 system detects an invalid data value from the data. The invalid data value may comprise a blank value (i.e., where blank values are restricted), an obsolete data value (e.g., an X data value may have formerly used as a valid data value, but is not currently considered valid), etc.
5. Computing system 10 determines a valid value. This step requires that computing system 10 may determine a valid data value. As a first example, computing system 10 may determine that whenever an X value is located it is replaced with a Y value. As a second example, computing system 10 may determine a valid data value by using other valid data fields to look up a valid value (i.e., by querying database 20).
6. Computing system 10 updates data element with the valid value.

The following description (steps) illustrates an example of implementation for repairing data objects (e.g., performing updates to a user profile record) during operation of a software application 18:

1. User A logs onto a procurement software application (e.g., software application 18)
2. The procurement software application retrieves a user profile (i.e., comprising user associated information) for user A.
3. The procurement software application checks for a blank value in a purchase type column of the user profile.
4. The procurement software application located a blank value for the purchase type.
5. The procurement software application uses a user vicinity setting from the user profile (i.e., queries a database) to lookup an appropriate purchase type value.
6. The procurement software application sets the purchase type to a new value.
7. The procurement software application stores the new purchase type in the database.

Figure 2:
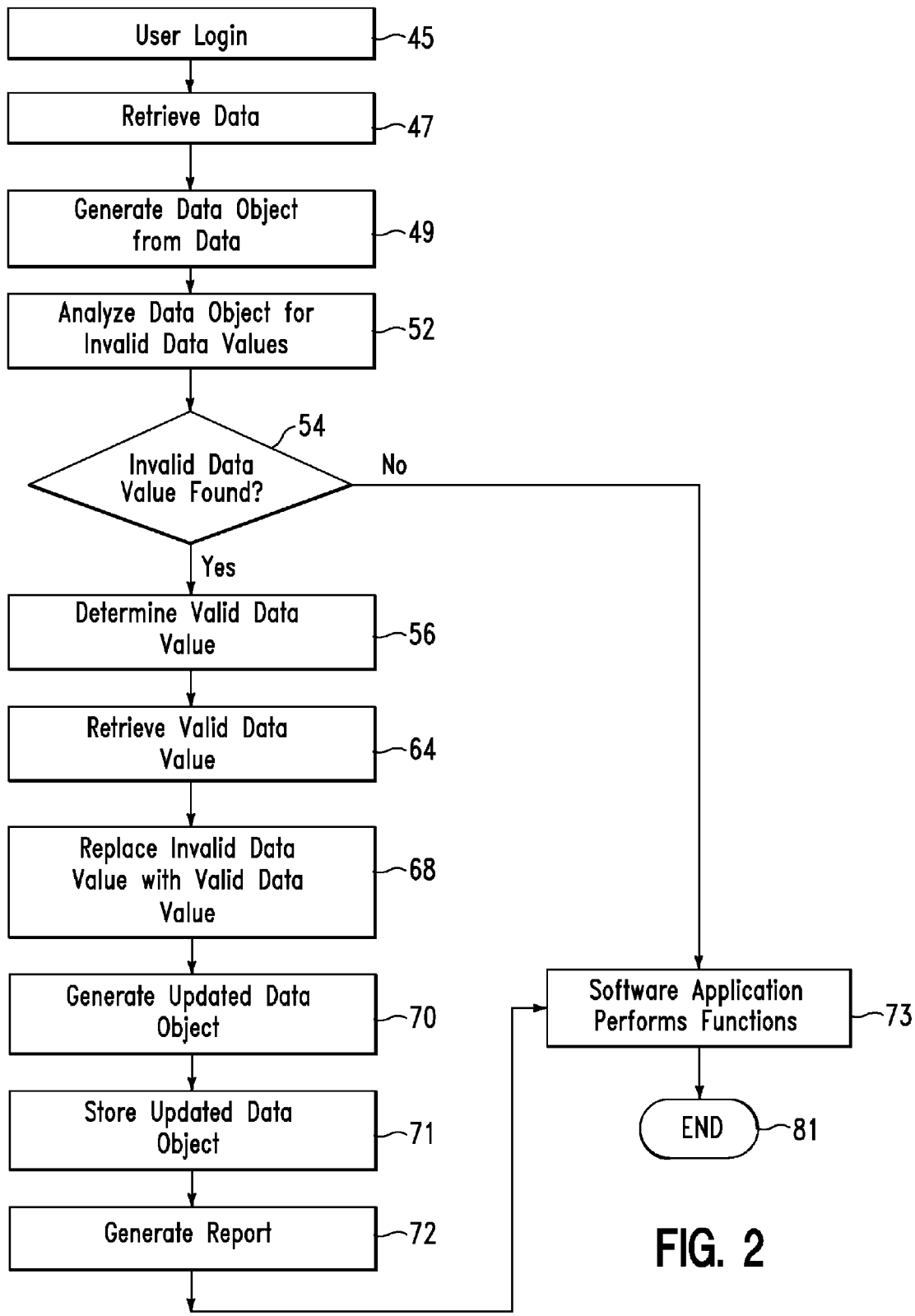
FIG. 2 illustrates a flowchart describing an algorithm used by the system of FIG. 1 for repairing data objects during operation of a software application, in accordance with embodiments of the present invention.

FIG. 2 illustrates a flowchart describing an algorithm used by system 2 of FIG. 1 for repairing data objects during operation of a software application 18, in accordance with embodiments of the present invention. In step 45, a user logs into software application 18 within computing system 10. In step 47, computing system 10 retrieves user associated data (e.g., a user profile) from database 20. In step 49, computing system 10 generates a first data object from the user associated data. In step 52, computing system 10 analyzes the first data object for invalid data values. In step 54, computing system 10 determines if an invalid data value exists in the first data object.

If in step 54, computing system 10 determines that an invalid data value does not exist in the first data object then in step 73, software application 18 performs its intended functions.

If in step 54, computing system 10 determines that an invalid data value does exist in the first data object then in step 56, computing system determines a valid data value. In step 64, computing system 10 retrieves a valid data value from database 20. In step 68, computing system 10 replaces the invalid data value with the valid data value. In step 70, computing system 10 generates an updated data object comprising the valid data value. In step 71, computing system 10 stores the updated data object. In step 72, computing system 10 generates an optional report detailing the replacement of the invalid data value with the valid data value. In step 73, software application 18 performs its intended functions and the process is terminated in step 81.

Figure 3:
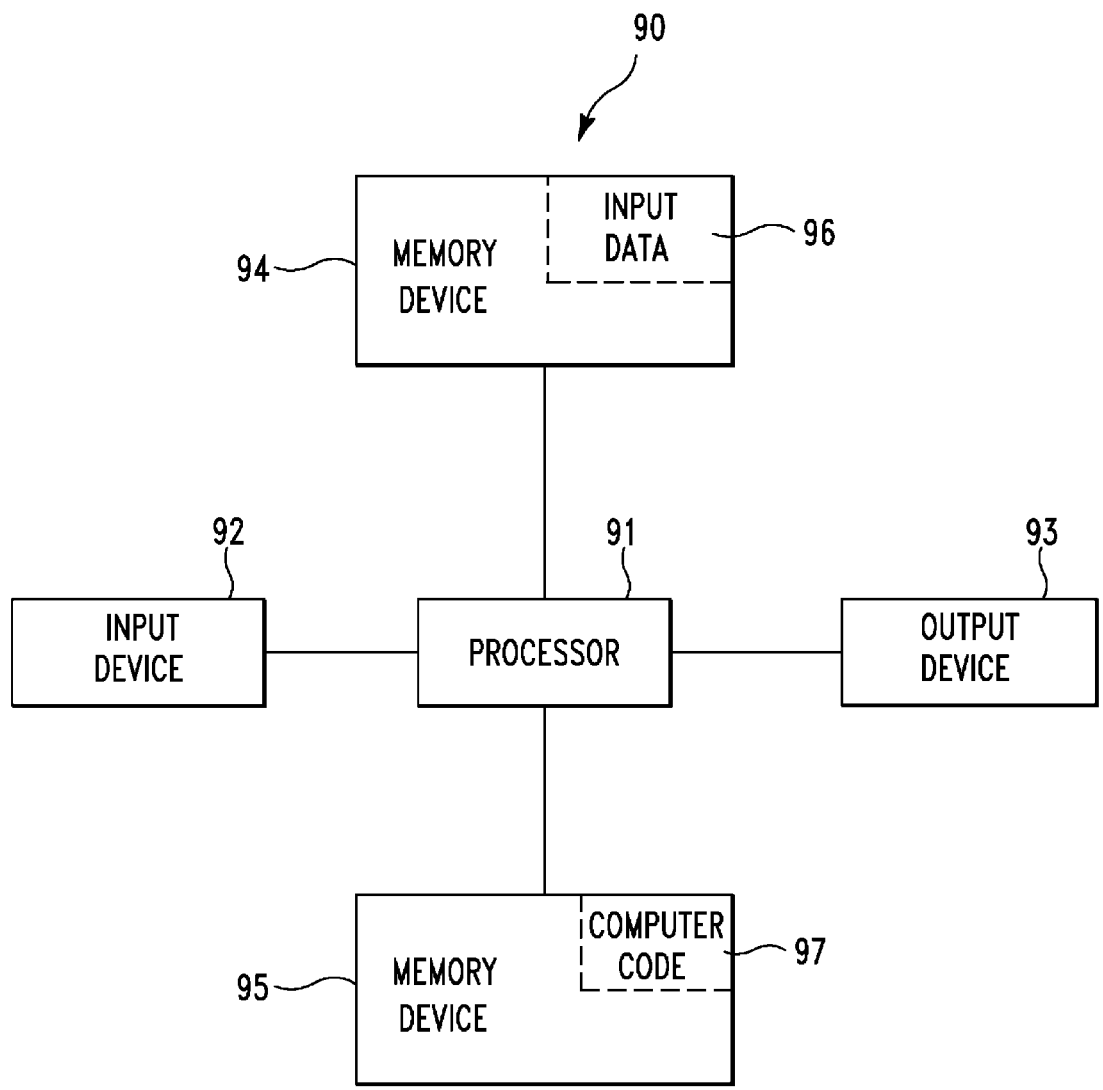
FIG. 3 illustrates a computer apparatus used for repairing data objects during operation of a software application, in accordance with embodiments of the present invention.

FIG. 3 illustrates a computer apparatus 90 (e.g., computing system 10 of FIG. 1) used for repairing data objects during operation of a software application, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for repairing data objects during operation of a software application. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to repair data objects during operation of a software application. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for repairing data objects during operation of a software application. In another embodiment, the invention provides a business method that performs the process steps of the invention on a subscription, advertising, and/or fee basis. That is, a service provider, such as a Solution Integrator, could offer to repair data objects during operation of a software application. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A data repair method comprising:
    enabling, by a computing system for a user, access to said computing system, wherein said computing system comprises a memory system, and wherein said memory system comprises a database and a software application;
    retrieving, by said computing system from said database, a user profile comprising first data associated with said user, said first data consisting of data associated with a user account for said user, a shopping cart for said user, and a bank account for said user;
    generating, by said computing system from said first data, a first data object;
    analyzing, by said computing system, data fields within said first data object using key columns;
    first determining, by a computer processor of said computing system in response to said analyzing, that said first data object comprises an invalid data value within a first data field of said data fields, said first data field associated with a purchase type column of said user profile, said invalid data value associated with a specific purchase type, said first determining occurring simultaneously while said software application performs intended purchase requisition functions for said user, said invalid data value comprising a blank data value;
    retrieving, by said computing system, a user vicinity setting from said user profile;
    querying, by said computing system based on said user vicinity setting, said database;
    locating, by said computing system based on results of said querying, a first data value, said first data value comprising a valid data value;
    retrieving, by said computing system from said database, said first data value;
    replacing, by said computing system within said first data field, said invalid data value with said first data value, said first data value allowing said software application to continue to perform said intended purchase requisition functions for said user, said retrieving said user vicinity setting, said querying, said locating, said retrieving said first data value, and said replacing occurring simulta- neously while said software application performs said intended purchase requisition functions;

generating, by said computing system from said first data object, a first updated data object comprising said first data value in said first data field; and storing, by said computing system in said memory system, said first updated data object.

2. The method of claim 1, wherein said first data object comprises an obsolete data value.

3. The method of claim 1, wherein said first data value comprises a default data value.

4. The method of claim 1, further comprising:

generating, by said computing system, a report specifying that said first updated data object has been generated.

5. The method of claim 1, wherein said retrieving said first data comprises performing a first database query, and wherein said retrieving said first data value comprises performing a second database query.

6. The method of claim 1, wherein said determining said first data value comprises selecting said first data value from a second data object in said database.

7. A computing system comprising a computer processor coupled to a computer-readable memory unit, said memory unit comprising instructions that when executed by the processor implements a data repair method, said method comprising:

enabling, by said computing system for a user, access to said computing system, wherein said computer-readable memory unit comprises a database and a software application;

retrieving, by said computing system from said database, a user profile comprising first data associated with said user, said first data consisting of data associated with a user account for said user, a shopping cart for said user, and a bank account for said user;

generating, by said computing system from said first data, a first data object;

analyzing, by said computing system, data fields within said first data object using key columns;

first determining, by said computer processor of said computing system in response to said analyzing, that said first data object comprises an invalid data value within a first data field of said data fields, said first data field associated with a purchase type column of said user profile, said invalid data value associated with a specific purchase type, said first determining occurring simultaneously while said software application performs intended purchase requisition functions for said user, said invalid data value comprising a blank data value;

retrieving, by said computing system, a user vicinity setting from said user profile;

querying, by said computing system based on said user vicinity setting, said database;

locating, by said computing system based on results of said querying, a first data value, said first data value comprising a valid data value;

retrieving, by said computing system from said database, said first data value;

replacing, by said computing system within said first data field, said invalid data value with said first data value, said first data value allowing said software application to continue to perform said intended purchase requisition functions for said user, said retrieving said user vicinity setting, said querying, said locating, said retrieving said first data value, and said replacing occurring simultaneously while said software application performs said intended purchase requisition functions;

generating, by said computing system from said first data object, a first updated data object comprising said first data value in said first data field; and storing, by said computing system in said memory system, said first updated data object.

8. The computing system of claim 7, wherein said first data object comprises an obsolete data value.

9. The computing system of claim 7, wherein said first data value comprises a default data value.

10. The computing system of claim 7, wherein said method further comprises:

generating, by said computing system, a report specifying that said first updated data object has been generated.

11. The computing system of claim 7, wherein said retrieving said first data comprises performing a first database query, and wherein said retrieving said first data value comprises performing a second database query.

12. The computing system of claim 7, wherein said determining said first data value comprises selecting said first data value from a second data object in said database.

13. A computer program product, comprising a computer readable storage medium comprising a computer readable program code embodied therein, said computer readable program code adapted to implement a data repair method when executed by a computer processor within a computing system comprising a computer-readable memory unit, said method comprising:

enabling, by said computing system for a user, access to said computing system, wherein said computer-readable memory unit comprises a database and a software application;

retrieving, by said computing system from said database, a user profile comprising first data associated with said user, said first data consisting of data associated with a user account for said user, a shopping cart for said user, and a bank account for said user;

generating, by said computing system from said first data, a first data object;

analyzing, by said computing system, data fields within said first data object using key columns;

first determining, by said computer processor of said computing system in response to said analyzing, that said first data object comprises an invalid data value within a first data field of said data fields, said first data field associated with a purchase type column of said user profile, said invalid data value associated with a specific purchase type, said first determining occurring simultaneously while said software application performs intended purchase requisition functions for said user, said invalid data value comprising a blank data value;

retrieving, by said computing system, a user vicinity setting from said user profile;

querying, by said computing system based on said user vicinity setting, said database;

locating, by said computing system based on results of said querying, a first data value, said first data value comprising a valid data value;

retrieving, by said computing system from said database, said first data value;

replacing, by said computing system within said first data field, said invalid data value with said first data value, said first data value allowing said software application to continue to perform said intended purchase requisition functions for said user, said retrieving said user vicinity setting, said querying, said locating, said retrieving said first data value, and said replacing occurring simultaneously while said software application performs said intended purchase requisition functions;

generating, by said computing system from said first data object, a first updated data object comprising said first data value in said first data field; and storing, by said computing system in said memory system, said first updated data object.

14. The computer program product of claim 13, wherein said first data object comprises an obsolete data value.

15. The computer program product of claim 13, wherein said first data value comprises a default data value.

16. The computer program product of claim 13, wherein said method further comprises:

generating, by said computing system, a report specifying that said first updated data object has been generated.

17. The computer program product of claim 13, wherein said retrieving said first data comprises performing a first database query, and wherein said retrieving said first data value comprises performing a second database query.

18. The computer program product of claim 13, wherein said determining said first data value comprises selecting said first data value from a second data object in said database.

19. A process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a data repair method, said method comprising:

enabling, by said computing system for a user, access to said computing system, wherein said computer-readable memory unit comprises a database and a software application;

retrieving, by said computing system from said database, a user profile comprising first data associated with said user, said first data consisting of data associated with a user account for said user, a shopping cart for said user, and a bank account for said user;

generating, by said computing system from said first data, a first data object;

analyzing, by said computing system, data fields within said first data object using key columns;

first determining, by a computer processor of said computing system in response to said analyzing, that said first data object comprises an invalid data value within a first data field of said data fields, said first data field associated with a purchase type column of said user profile, said invalid data value associated with a specific purchase type, said first determining occurring simultaneously while said software application performs intended purchase requisition functions for said user, said invalid data value comprising a blank data value;

retrieving, by said computing system, a user vicinity setting from said user profile;

querying, by said computing system based on said user vicinity setting, said database;

locating, by said computing system based on results of said querying, a first data value, said first data value comprising a valid data value;

retrieving, by said computing system from said database, said first data value;

replacing, by said computing system within said first data field, said invalid data value with said first data value, said first data value allowing said software application to continue to perform said intended purchase requisition functions for said user, said retrieving said user vicinity setting, said querying, said locating, said retrieving said first data value, and said replacing occurring simultaneously while said software application performs said intended purchase requisition functions;

generating, by said computing system from said first data object, a first updated data object comprising said first data value in said first data field; and storing, by said computing system in said memory system, said first updated data object.

20. The process of claim 19, wherein said first data object comprises an obsolete data value.

21. The process of claim 19, wherein said first data value comprises a default data value.

22. The process of claim 19, wherein said method further comprises:

generating, by said computing system, a report specifying that said first updated data object has been generated.

23. The process of claim 19, wherein said retrieving said first data comprises performing a first database query, and wherein said retrieving said first data value comprises performing a second database query.

24. The process of claim 19, wherein said determining said first data value comprises selecting said first data value from a second data object in said database.

* * * * *